United States Patent
Maeda et al.

[11] Patent Number: 5,899,614
[45] Date of Patent: May 4, 1999

[54] OUTPUT METHOD AND APPARATUS

[75] Inventors: Masao Maeda, Machida; Wataru Sakagami, Yokohama, both of Japan

[73] Assignee: Canon Kabushiki Kaisha, Tokyo, Japan

[21] Appl. No.: 08/433,130

[22] Filed: May 3, 1995

Related U.S. Application Data

[63] Continuation of application No. 08/021,548, Feb. 24, 1993, abandoned.

[30] Foreign Application Priority Data

Jun. 30, 1992 [JP] Japan .................................. 4-196167
Feb. 5, 1993 [JP] Japan .................................. 5-018850

[51] Int. Cl.⁶ .............................................. B41J 5/30
[52] U.S. Cl. ............................................. 400/62; 400/70
[58] Field of Search ................................ 400/61, 76, 62, 400/70; 395/114

[56] References Cited

U.S. PATENT DOCUMENTS

| | | | |
|---|---|---|---|
| 4,754,428 | 6/1988 | Schultz | 400/76 |
| 4,891,769 | 1/1990 | Tasaki | 400/76 |
| 4,926,373 | 5/1990 | Takenaka | 395/115 |
| 4,968,159 | 11/1990 | Sasaki | 400/61 |
| 5,119,473 | 6/1992 | Ikenoue | 395/114 |
| 5,123,757 | 6/1992 | Nagaoka | 395/114 |
| 5,328,278 | 7/1994 | Kokubo | 395/114 |
| 5,469,373 | 11/1995 | Kashiwazaki et al. | 364/550 |
| 5,580,177 | 12/1996 | Gase et al. | 395/114 |

FOREIGN PATENT DOCUMENTS

| | | | |
|---|---|---|---|
| 218872 | 9/1989 | Japan | 400/61 |
| 298428 | 12/1989 | Japan | 400/76 |

*Primary Examiner*—John Hilten
*Attorney, Agent, or Firm*—Fitzpatrick, Cella, Harper & Scinto

[57] ABSTRACT

Output apparatus and method of a printer, a display, or the like for receiving a group of commands from a host computer and for changing subsequent data processes. The output apparatus comprises: a substituting circuit for substituting another discrimination information for discrimination information to be changed in accordance with an input of instruction information to instruct a change in discrimination information stored; and an executing circuit for executing a predetermined operation shown by the discrimination information before it is substituted by the substituting circuit in accordance with an input of the discrimination information substituted by the substituting circuit. A command table of an output unit is rewritten by a special command from the host computer, thereby enabling a desired outputting process to be selectively executed while the host computer easily discriminates the output unit.

7 Claims, 6 Drawing Sheets

OUTPUT METHOD AND APPARATUS

This application is a continuation of application Ser. No. 08/021,548 filed Feb. 24, 1993, now abandoned.

BACKGROUND OF THE INVENTION

1. Field of the Invention

The present invention relates to output apparatus and method such as printer, display (CRT, LCD), or the like for receiving a command group from a higher order apparatus such as a host computer or the like and changing subsequent data processes.

2. Related Background Art

Conventional printers, displays (CRT, LCD, etc.) or other such output apparatuses receive a series of commands in a command group from a higher order apparatus (such as a host computer) and change subsequent data processes based on the commands. Each of the above output apparatuses has a function to discriminate between data and commands.

In the same kind of apparatus, however, a series of character train (character train in a command table) to recognize input data as a command are fixed. Therefore, in a system using a general interface such as a SCSI (Small Computer System Interface) such that a plurality of same output apparatuses are connected to one higher order apparatus and the apparatus numbers cannot be designated, there is a problem such that since the higher order apparatus cannot discriminate the apparatus numbers, a plurality of output apparatuses simultaneously execute command processes so as to compete with one another or the like.

SUMMARY OF THE INVENTION

The present invention is made in consideration of the problem of the above conventional apparatus and it is an object of the invention to provide output apparatus and method in which by rewriting a command table of the output apparatus by a special command from a higher order apparatus, a desired outputting process can be selectively executed while the higher order apparatus easily discriminates the output apparatus.

To solve the above problem, according to the present invention, there is provided an output apparatus comprising: substituting means for substituting another discrimination information for discrimination information to be changed in accordance with an input of instruction information to instruct a change in discrimination information stored; and executing means for executing a predetermined operation indicated by the identification information before it is substituted by the substituting means in accordance with the input of the discrimination information which has been substituted by the substituting means.

The discrimination information indicates a parameter of a control command indicative of a predetermined operation.

The instruction information indicates the discrimination information to be changed and the discrimination information after it was changed.

The instruction information is set from an outside.

The output apparatus has searching means for searching the discrimination information which has been indicated by the instruction information and should be changed from the discrimination information stored.

The output apparatus has warning means which is constructed such that in the case where the discrimination information to be changed is not stored, a message indicative of such a fact is warned to the outside.

To solve the above problem, according to the present invention, there is provided an output method comprising the steps of: substituting another discrimination information for discrimination information to be changed in accordance with an input of instruction information to instruct a change in discrimination information stored; and executing a predetermined operation indicated by the discrimination information before it is substituted in the substituting step in accordance with an input of the substituted discrimination information.

The discrimination information indicates a parameter of a control command indicative of a predetermined operation.

The instruction information indicates the discrimination information to be changed and the discrimination information after it was changed.

The instruction information is set from an outside.

The discrimination information which is shown by the instruction information and should be changed is searched from the discrimination information stored.

In the case where the discrimination information to be changed is not stored, a message indicative of such a fact is informed to the outside.

DETAILED DESCRIPTION OF THE PREFERRED EMBODIMENTS

Prior to explaining a construction of the present invention, a construction of an output apparatus which is suitable to apply an embodiment of the invention will be first described with reference to FIGS. 2 and 7.

An output apparatus to which the embodiment is applied is not limited to a laser beam printer but may be a printer of another printing system such as an ink jet printer, which will be explained hereinlater.

Figure 7:
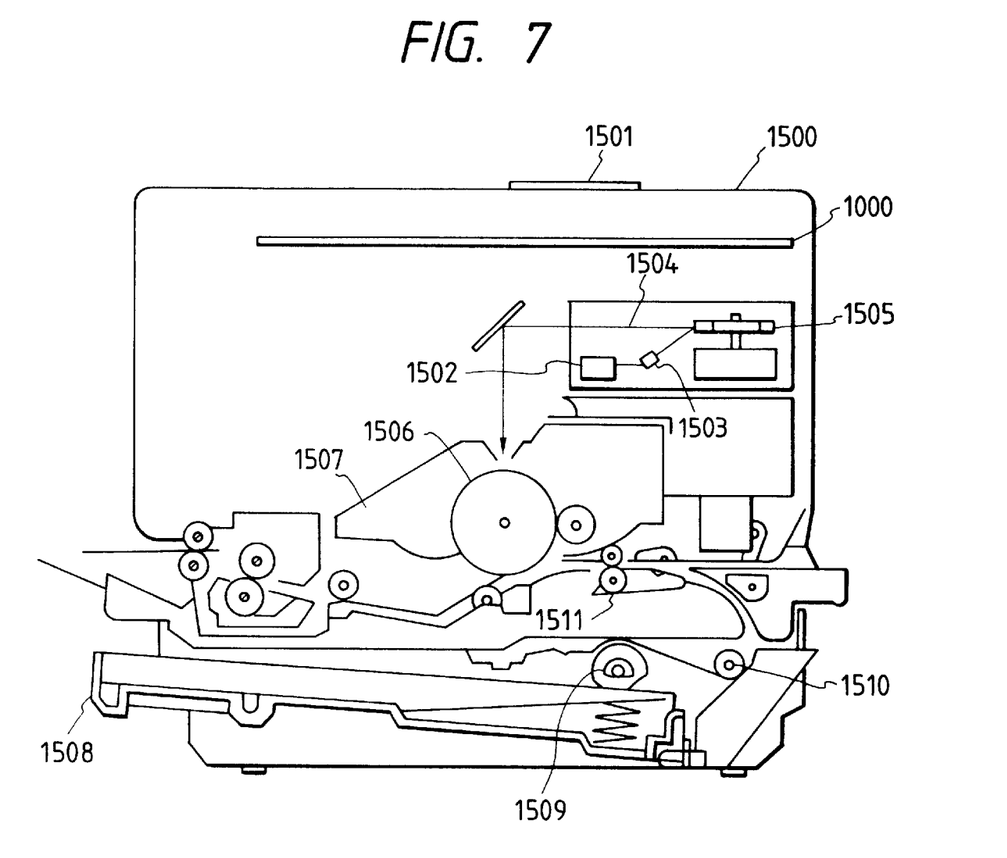
FIG. 7 is a cross sectional view showing a construction of a first output apparatus to which the present invention can be applied.

FIG. 7 is a cross sectional view showing a construction of a first output apparatus to which the present invention can be applied. For instance, FIG. 7 shows the case of a laser beam printer (LBP).

In the diagram, reference numeral 1500 denotes an LBP main body. The LBP main body 1500 receives and stores print data (character codes or the like), form data, macro instruction, or the like which is supplied from an external apparatus such as a host computer or the like connected to the outside. The LBP 1500 forms a corresponding character pattern, form pattern, or the like in accordance with those data and forms an image onto a recording paper as a recording medium. Reference numeral 1501 denotes an operation panel on which switches for operation, an LED display, and the like are arranged and 1000 indicates a printer control unit to control the whole LBP main body 1500 and to analyze print data or the like which is supplied from the host computer. The printer control unit 1000 mainly converts a character code into a video signal of the corresponding character pattern and supplies to a laser driver 1502. The laser driver 1502 is a circuit to drive a semiconductor laser 1503. In accordance with an input video signal, the laser driver 1502 on/off switches a laser beam 1504 which is emitted from the semiconductor laser 1503. The laser beam 1504 is swung to the right and left by a rotary polygon mirror 1505 and scans and exposes on an electrostatic drum 1506. Due to this, an electrostatic latent image of the character pattern is formed on the drum 1506. The latent image is developed by a developing unit 1507 arranged around the drum 1506 and, after that, it is transferred onto a recording paper. A cut sheet is used as a recording paper. Cut sheet recording papers are enclosed in a sheet cassette 1508 set in the LBP 1500. The recording paper is picked up and conveyed into the apparatus by a feed roller 1509 and conveying rollers 1510 and 1511 and is fed to the drum 1506.

Figure 1:
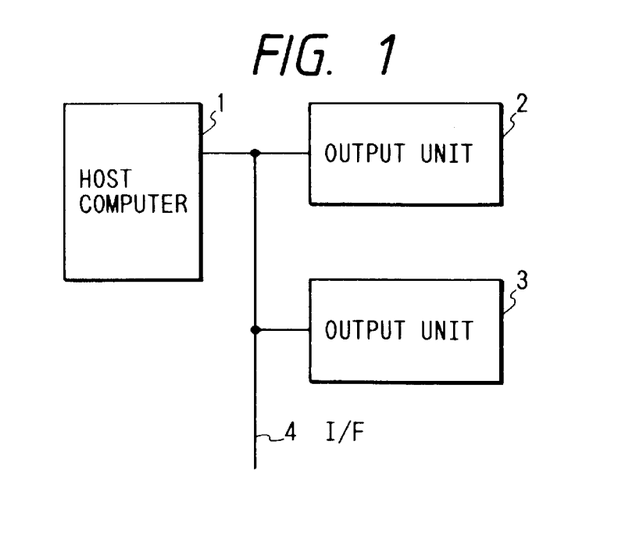
FIG. 1 is a constructional diagram showing an example of a system to which an output apparatus according to an embodiment of the present invention is applied.

FIG. 1 is a constructional diagram showing an example of a system to which an output apparatus of the present invention is applied.

In the diagram, reference numeral 1 denotes a higher order apparatus such as a host computer or the like. Output units 2 and 3 are connected to the host computer 1 through a predetermined interface 4.

Hitherto, a command which is interpreted by the output unit 2 is generated from the higher order apparatus (hereinafter, referred to as a host computer) 1. The output unit 3 which interpretes the same command as the above command is newly connected to the host computer 1, thereby constructing the system shown in FIG. 1. Therefore, each of the output units simultaneously interpretes a predetermined command from the host computer and executes a command process in competition with other output units.

As will be explained hereinlater, the output unit 3 which is newly connected updates a parameter of each command stored in a command table which is referred to when the command is interpreted. By merely sending a new command to the output unit 3 from the host computer by using an application program corresponding to the updated command parameter, competition of command processes between output apparatuses can be easily prevented.

Figure 2:
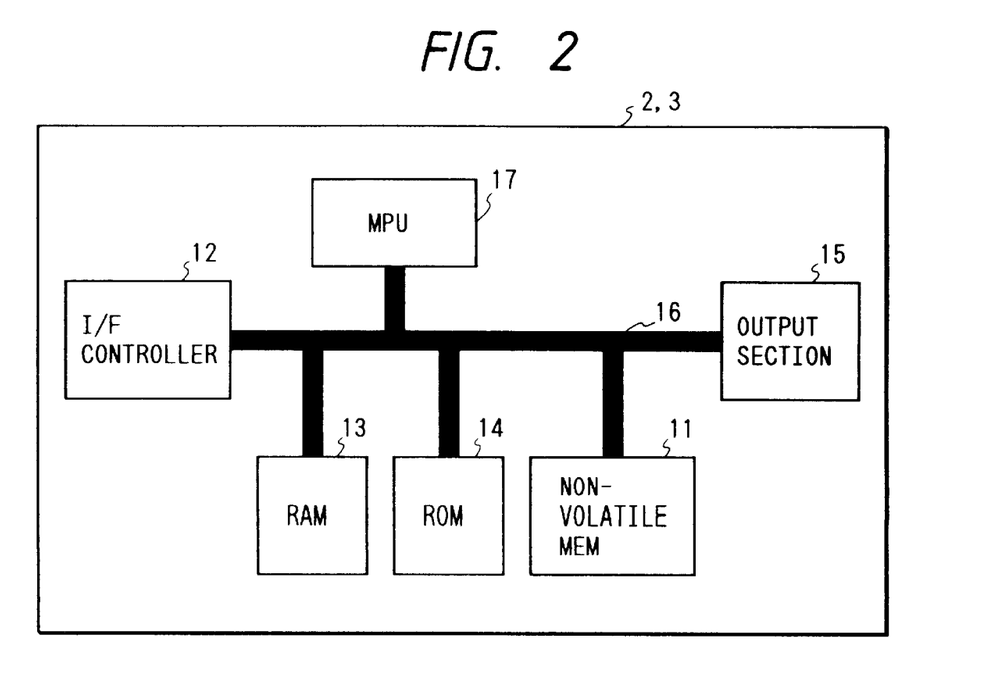
FIG. 2 is a block diagram showing a fundamental construction of the output apparatus shown in FIG. 1.

FIG. 2 is a block diagram showing a detailed construction of each of the output units 2 and 3 shown in FIG. 1.

In the diagram, reference numeral 11 denotes a nonvolatile memory (for example, an RAM, a flash memory, or the like having a backup power source) in which a command table, which will be explained hereinlater, has been stored. Reference numeral 12 denotes an interface controller which is connected to the interface 4 and controls a communication with the host computer 1. Reference numeral 13 denotes an RAM which functions as a work memory to execute a control program (control program shown in a flowchart of FIG. 4 or the like) which has been stored in an ROM 14 and is mainly executed by an MPU 17. Reference numeral 15 denotes an output section which executes a print outputting process in the embodiment. Reference numeral 16 denotes an internal bus which connects the MPU 17 and each section. After power sources of the output units 2 and 3 were turned on, the output units are set into an apparatus nonselective condition. Although the embodiment will be described with respect to the print outputting process as an example, the present invention can be also applied to a display outputting process to a CRT or the like.

In the output unit constructed as mentioned above, when the output unit 3 receives a special command by a command sequence with the host computer 1, on the basis of the special command analyzed by the MPU 17, the MPU 17 changes the set value of the command table which is constructed in the nonvolatile memory 11. Thus, after the command table was rewritten by the MPU 17, a special command sequence which is generated from the host computer can be selectively executed.

On the other hand, a memory medium to store the command table is constructed by the nonvolatile memory 11 and the content in the command table is held irrespective of on/off state of the power source, so that the host computer can immediately discriminate the special output unit after the turn-on of the power source.

Further, by making it possible to set a mode to receive a special command by a function process of the MPU 17, a special command reception timing can be arbitrarily set.

Figure 3:
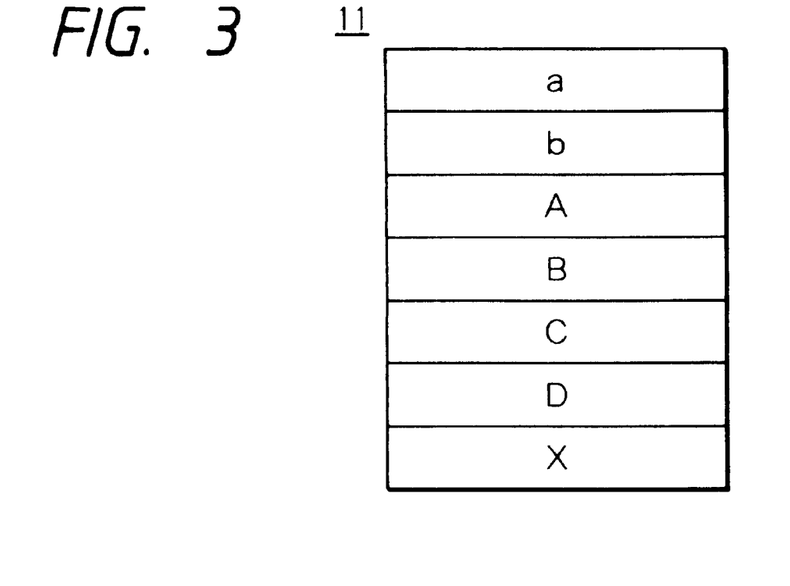
FIG. 3 is a diagram showing an example of a command table which is stored into a nonvolatile memory shown in FIG. 2.

FIG. 3 is a diagram showing an example of the command table which is stored into the nonvolatile memory 11 shown in FIG. 2.

In the diagram, reference characters a, b, A to D, and X denote commands and correspond to, for example, the following command processes.

ESCa . . . Apparatus selection: makes the subsequent data valid

ESCb . . . Function nonselection: makes all of the data invalid until ESCa is received ESCA . . . Setting of an enlarged character: enlarges the subsequent data in the lateral direction and displays ESCB . . . Cancel of an enlarged character: cancels the enlargement in the lateral direction ESCCn . . . Set/cancel of an Italic character: start/end of the Italic display ESCDn . . . Set/cancel of a mesh character: start/end of a mesh display ESCXnm . . . Change of a control code A command sequence in the output unit according to the present invention will now be described hereinbelow with reference to the flowchart shown in FIG. 4.

Figure 4:
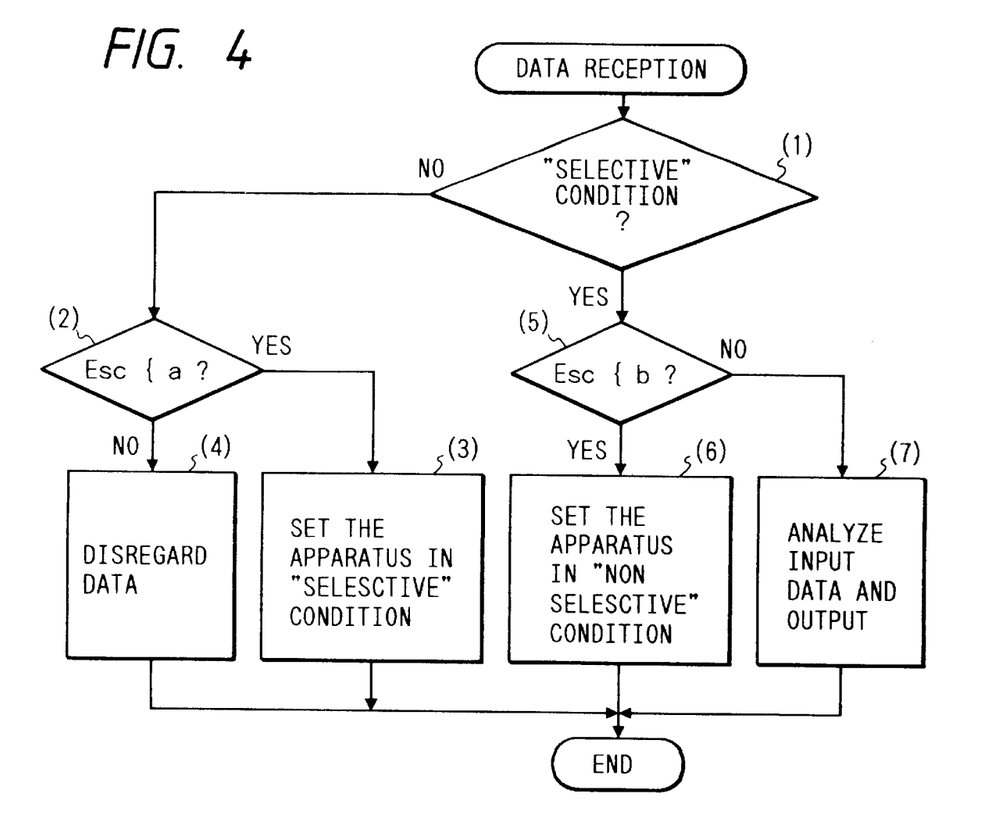
FIG. 4 is a flowchart showing an example of a command sequence in the output apparatus according to the embodiment of the present invention.

FIG. 4 is a flowchart showing an example of the command sequence in the output unit according to the present invention. Reference numerals (1) to (7) denote processing steps which are controlled by the MPU 17 shown in FIG. 2.

After the power sources of the output units 2 and 3 were turned on, those output units are in the apparatus nonselective condition. Therefore, the result of the judgment in step (1) is NO. Until the ESCa command sequence is received (2), all of the data are ignored (abandoned) (4).

On the other hand, when the ESCa command sequence is received in step (2), the output units are set into the selective condition (3) and the subsequent data is made valid.

Due to this, the result of the judgment in step (1) is YES. A check is made to see if the received command sequence is ESCb or not (5). If YES in step (5), the output units are set into the nonselective condition (6) and the subsequent data is ignored until the ESCa command sequence is received.

On the other hand, if NO in step (5), the input data is analyzed and outputted (7). The processing routine is finished.

Therefore, assuming that the system is constructed as shown in FIG. 1, when the host computer 1 generates the command sequence, the output units 2 and 3 respectively recognize it as a correct command, so that both of the output units 2 and 3 execute the command process in competition with each other.

Figure 5:
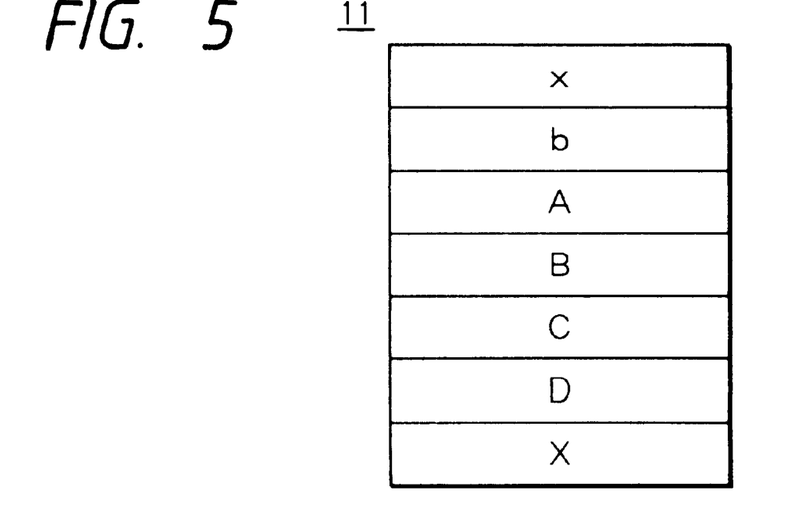
FIG. 5 is a diagram showing a rewriting state of a command table which is stored into the nonvolatile memory shown in FIG. 2.

Therefore, the output unit 3 is made operative in a mode to execute only ESCX. After that, when the host computer 1 generates a command ESCXax, the MPU 17 rewrites the content in the command table (refer to FIG. 3) stored in the nonvolatile memory 11 of the output unit 3 to the content in a command table shown in FIG. 5. After that, therefore, only when the host computer receives ESCx, the host computer 1 regards a command header as the same command sequence as the preceding ESCa and can execute the data process. The host computer 1 can discriminate the output units 3 and 2 by software and enables the same command sequence to be executed while discriminating such as output unit 3 or output unit 2. The memory information of the content in the rewritten command table shown in FIG. 5 is not lost even when the power source is turned off.

After that, therefore, the host computer 1 sandwiches a group of various kinds of commands by ESCa (command header) and ESCb (command footer) for the output unit 2 and sandwiches them by ESCX (command header) and ESCb (command footer) for the output unit 3, so that the data can be generated while distinguishing the output units.

A rewriting process of the command table in the nonvolatile memory 11 shown in FIG. 2 will now be described. The rewriting process is executed before a product (for example, output unit 3) is shipped.

A command "ESCXnm" for command rewriting is constructed in a form such that the first parameter n of such a command designates the present command header and the second parameter m designates a new command header. Due to this, when the output unit 3 receives the command sequence including the command "ESCXax", the MPU 17 searches the command table in the nonvolatile memory 11 and finds out the same character as the first parameter "a" and substitutes the second parameter "x" for the coincident portion. By the above processes, "a" in the command table is changed to "x", namely, the command sequence is updated.

In case of returning the updated content to the original content, for instance, a command "ESCXmn" such that the first parameter n and the second parameter m of the command rewriting command "ESCXnm" are exchanged is used. Due to this, when the output unit 3 receives a command sequence including the command "ESCXxa", the MPU 17 searches the command table in the nonvoltatile memory 11 and finds out the same character as the first parameter "x" and substitutes the second parameter "a" for the coincident portion. By the above processes, "x" in the command table is changed to "a". Namely, the command sequence is updated to the original content (content before it is updated by the command "ESCXax").

The above embodiment has been described with respect to the case where each command is supplied from the higher order apparatus such as a host computer or the like before the product is shipped. However, the present invention can be also obviously applied to the case where the user or service person sets each command by using the operation panel 1501 or the like shown in FIG. 7 after the product was shipped or each command is inputted by a higher order apparatus such as a host computer or the like.

In this instance, in the case where the first parameter is the same as a header "x" of a special command, particularly, a command for rewriting, an erroneous operation can be prevented by executing a process to make the received command invalid. Similarly, as a result of the search of the first parameter, even when the corresponding character doesn't exist in the command table, namely, when the first parameter doesn't coincide with the header "x", the input command is made invalid. When such an improper command sequence is received, an error can be also informed to the host computer 1 so long as the interface is a bidirectional interface, for instance, an RS232C, centronics, or the like. The occurrence of error can be certainly known by displaying an error by using a display function (for instance, the operation panel 1501 shown in FIG. 7) or the like provided for the output unit 3 irrespective of the kind of interface. Whether the output unit is set into the operation impossible state when an improper command sequence is received or not differs in dependence on the environment where the output units 2 and 3 are used. Therefore, it is sufficient to construct so that the output units can properly cope with such an environment condition.

The above embodiment has been described with respect to the example of the process to substitute "x" for the header "a" in the command table by the command "ESCXax" for command rewriting. However, "A" of the command "ESCA" can be also replaced to another character train.

The above embodiment has been described with respect to the case where in order to prevent the unexpected rewriting of the command table for the generation of the ESCX command sequence by the unexpected operation on the host computer 1 side, the output unit 3 is made operative in the mode to receive only the command "ESCX" to change the command sequence. However, the invention is not limited to such a special mode. For instance, in a state such that the power source of only the output unit in which the operator wants to change the command header is turned on and the power sources of the other output units are turned off, a similar effect can be also expected.

Figure 6:
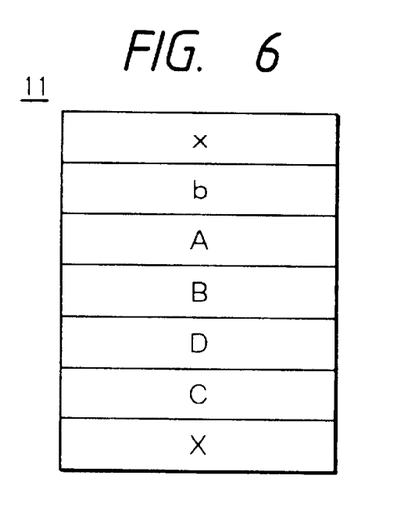
FIG. 6 is a diagram showing another rewriting state of a command table which is stored into the nonvolatile memory shown in FIG. 2.

Further, although the above embodiment has been described with respect to the case where a character train of one command is substituted, character trains of a plurality of commands can be also substituted. With such a construction, not only the output units are selected but also an output form can be changed every output unit. For instance, in the above embodiment, it is also possible to execute processes such that when a special character or a part of a sentence is emphasized and outputted by switching "C" and "D" shown in FIG. 5 as shown in FIG. 6 with respect to the command table of the output unit 3 by using the ESCx command sequence, the output unit 2 generates Italic characters and the output unit 3 generates mesh characters.

As described above, according to the present invention, by the command sequence with the host computer, a new output unit (for example, output unit 3) receives a special command, the MPU 17 changes the set value in the command table on the basis of the special command which has been analyzed by the MPU 17, and a new command is transmitted from the host computer to the new output unit by using an application program corresponding to the changed command table. By merely executing the above processes, the competition of the command processes can be easily prevented and the special command sequence which is transmitted from the host computer can be selectively executed.

Since the content in the command table is held irrespective of the on/off state of the power source, after the power source was turned on, the host computer can immediately discriminate the special output unit.

Further, since the mode to receive a special command can be set by the function process of the MPU 17, the reception timing for the special command can be arbitrarily set.

There are consequently excellent effects such that the header or the like of the command table of the output unit can be easily changed and, even in case of an interface which cannot discriminate the number of the output unit, a system which can designate the number of the output unit from the host computer side can be easily constructed, and the like.

The present invention can be applied to a system which is constructed by a plurality of equipment of an apparatus comprising one equipment. The invention can be also applied to the case where the invention is accomplished by supplying a program to embody the present invention to such a system or an apparatus.

Figure 8:
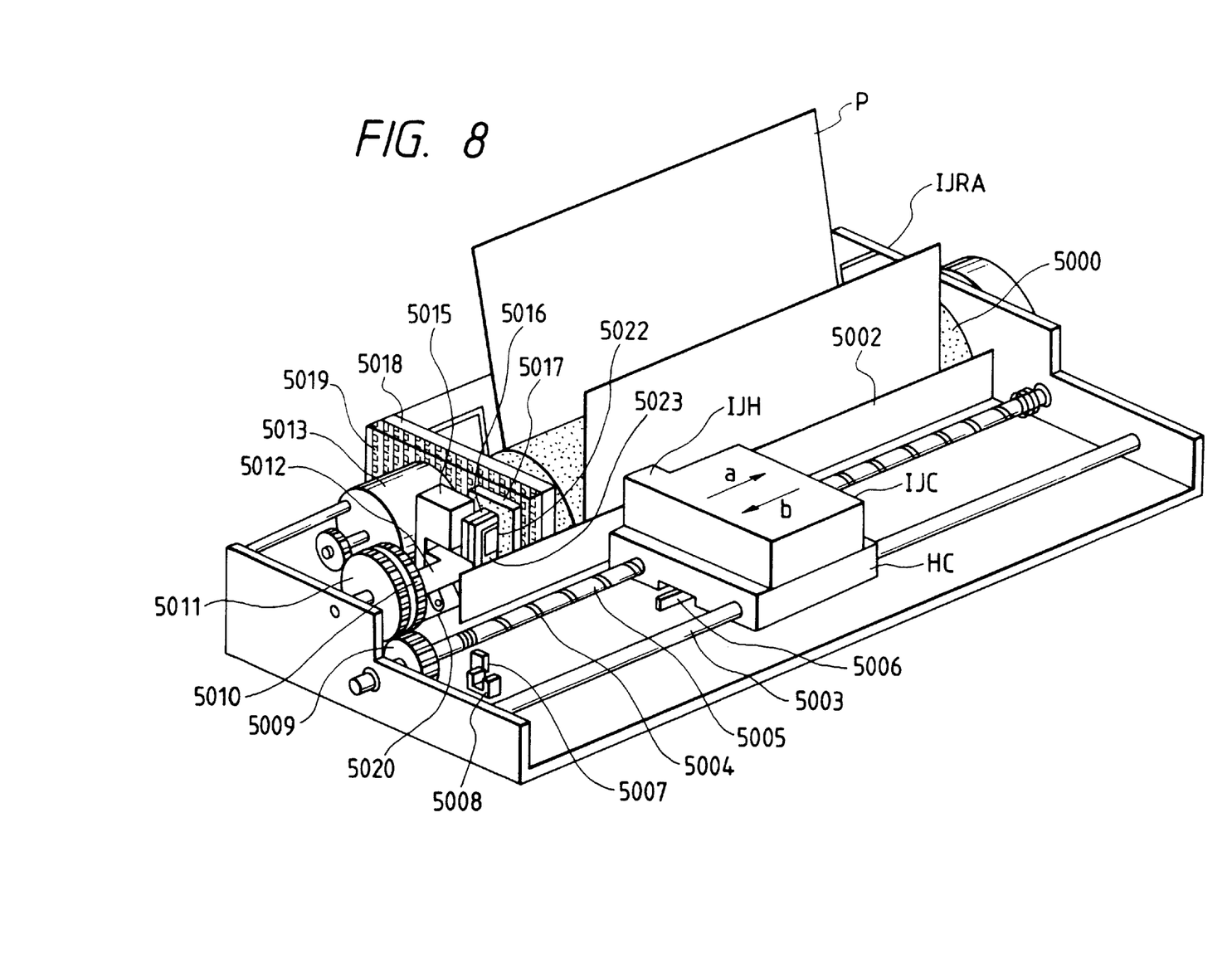
FIG. 8 is an external view showing a construction of a second output apparatus to which the present invention can be applied.

Although the above embodiment has been described with respect to the case where the laser beam printer is used as an output unit as an example, the invention can be also applied to a printer of another printing system as shown in FIG. 8, which will be explained hereinlater, or a display apparatus such as a CRT or the like.

FIG. 8 is an external view showing a construction of a second output unit to which the present invention can be applied and shows the case of, for instance, an ink jet printing apparatus (IJRA).

In the diagram, a lead screw 5005 is rotated interlockingly with the forward/reverse rotation of a drive motor 5013 through driving force transfer gears 5011 and 5009. A carriage HC which is come into engagement with a spiral groove 5004 formed on the lead screw 5005 has a pin (not shown) and is reciprocated in the directions shown by arrows a and b. An ink jet cartridge IJC is mounted in the carriage HC. Reference numeral 5002 denotes a paper pressing plate for pressing a paper onto a platen 5000 in the moving direction of the carriage. Reference numerals 5007 and 5008 denote photocouplers serving as home position detecting means for recognizing the existence of a lever 5006 of the carriage in a region of the photocoupler and for performing the switching operation or the like of the rotating direction of the drive motor 5013. Reference numeral 5016 denotes a member to indicate a cap member 5022 to cap the whole surface of a recording head, and 5015 indicates attracting means for attracting the inside of the cap. The attracting means 5015 executes an attraction recovery of the recording head through an opening 5023 in the cap. Reference numeral 5017 denotes a cleaning blade which can be moved in the front and rear directions by a member 5019; 5018 a main body supporting plate for supporting the cleaning blade 5017 and the member 5019; and 5012 a lever to start the attraction of the attraction recovery. The lever 5012 is moved in association with the movement of a cam 5020 which is come into engagement with the carriage. A driving force from the drive motor is transferred and controlled by well-known transfer means such as clutch switching means or the like.

The capping, cleaning, and attraction recovery are constructed such that a desired process can be executed at the corresponding position thereof by the operation of the lead screw 5005 when the carriage reaches a region on the home position side. However, it is also possible to execute a desired operation at a well-known timing.

Figure 9:
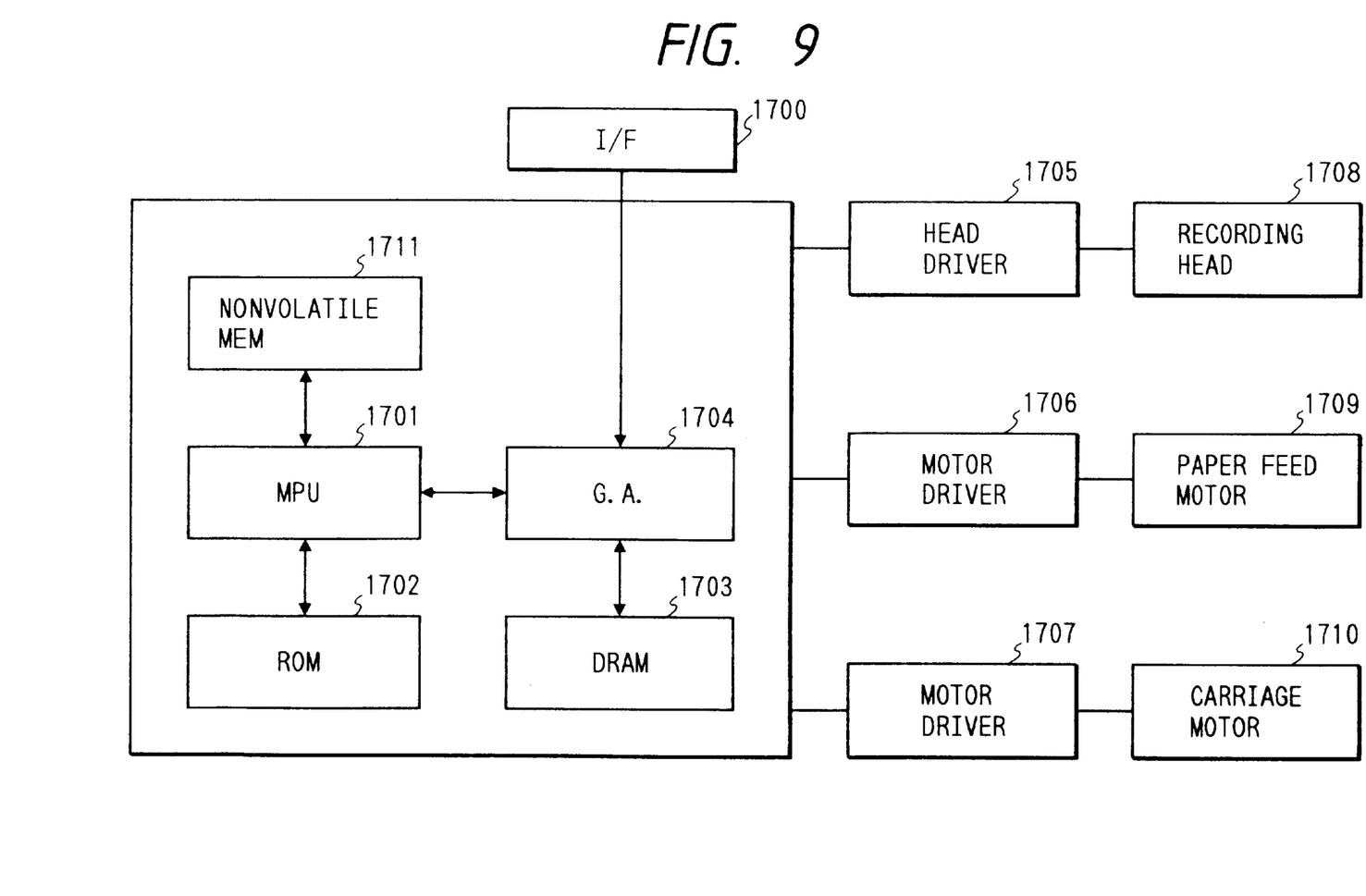
FIG. 9 is a block diagram showing a fundamental construction of the second output apparatus shown in FIG. 8.

FIG. 9 is a block diagram for explaining a control construction of the second output unit shown in FIG. 8.

In the diagram, reference numeral 1700 denotes an interface to input print data or the like including a character code, a control code, and the like; 1701 an MPU; 1702 a program ROM to store a control program (program based on the flowchart shown in FIG. 4) or the like which is executed by the MPU 1701; 1703 a DRAM to store various kinds of data (the above recording signal and the recording data which is supplied to a head and the like); and 1704 a gate array to supply and control the recording data to a recording head 1708 and to also execute a transfer control of data among the interface 1700, the MPU 1701, and the DRAM 1703. Reference numeral 1710 denotes a carriage motor to convey the recording head 1708; 1709 a conveying motor to convey a recording paper; 1705 a head driver to drive the recording head; 1706 a motor driver to drive the conveying motor 1709; 1707 a motor driver to drive the carriage motor 1710; and 1711 a nonvolatile memory (for example, an RAM, a flash memory, or the like having a backup power source) in which the foregoing command table has been stored.

In each of the output units constructed as mentioned above, when the print data or the like is supplied from the host computer through the interface 1700, the print data is converted into the image data to print between the gate array 1704 and the MPU 1701. The motor drivers 1706 and 1707 are driven and the recording head is driven in accordance with the image data sent to the head driver 1705, thereby executing the printing operation.

What is claimed is:

1. A print control apparatus which analyzes print data received from an external apparatus, generates output data based on the analyzed print data, and controls a print apparatus to print the output data, comprising:

table means for storing a plurality of commands, which can be included in the print data received from the external apparatus, together with information indicative of data processing corresponding to the commands; and control means for replacing in said table means at least a first command included in the plurality of stored commands with a second command, when a specific command is received from the external apparatus designating that the first command is to be replaced by the second command.

2. The print control apparatus according to claim 1, wherein said table means stores the plurality of commands in a non-volatile memory.

3. The print control apparatus according to claim 1, wherein if the first command designated by the specific command does not exist in said table means, said control means so informs externally of said print control apparatus.

4. A print control method for use with a data table in which a plurality of commands is stored in correspondence with data processing information, said method comprising the steps of:

receiving print data from an external apparatus;

determining whether the print data includes one of the stored commands in order to process the print data in accordance with the data processing information corresponding to the one of the stored commands; and if the print data includes a change command designating that a first command is to be replaced by a second command, replacing in the table the first command with the second command.

5. The method according to claim 4, further comprising the step of, if the first command designated in the change command is not stored in the table, transmitting an error signal.

6. A computer-readable memory medium for storing computer-executable process steps for use with a data table in which a plurality of commands is stored in correspondence with data processing information, the computer-executable process steps comprising:

receiving print data from an external apparatus;

determining whether the print data includes one of the stored commands in order to process the print data in accordance with the data processing information corresponding to the one of the stored commands; and if the print data includes a change command designating that a first command is to be replaced by a second command, replacing in the table the first command with the second command.

7. The memory medium according to claim 4, wherein the computer-executable process steps further comprise the step of, if the first command designated in the change command is not stored in the table, transmitting an error signal.

* * * * *